United States Patent
Zustak et al.

(10) Patent No.: US 6,967,588 B2
(45) Date of Patent: *Nov. 22, 2005

(54) SYSTEM AND METHOD FOR CONTROLLING A HOME ENTERTAINMENT SYSTEM

(75) Inventors: Frederick J. Zustak, Poway, CA (US); Greg Gudorf, San Diego, CA (US); Aaron Dew, San Diego, CA (US); Anthony Lionel Creed, San Diego, CA (US); Matthew Chang, San Diego, CA (US); William Hausch, Manhattan Beach, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 583 days.

This patent is subject to a terminal disclaimer.

(21) Appl. No.: 10/106,803

(22) Filed: Mar. 25, 2002

(65) Prior Publication Data

US 2003/0179100 A1 Sep. 25, 2003

(51) Int. Cl.[7] .............................................. G05B 19/02
(52) U.S. Cl. ................... 340/825.22; 348/734
(58) Field of Search ..................... 340/825.22, 5.25, 340/5.65, 825.69, 825.72; 725/153, 152, 725/39; 348/734, 569, 552, 553; 710/305; 345/158, 169

(56) References Cited

U.S. PATENT DOCUMENTS

| | | | | |
|---|---|---|---|---|
| 5,341,166 A | * | 8/1994 | Garr et al. ................... 725/153 |
| 5,828,862 A | | 10/1998 | Singkornrat et al. ......... 711/115 |
| 5,928,347 A | * | 7/1999 | Jones .......................... 710/305 |
| 5,930,358 A | | 7/1999 | Rao ............................ 713/193 |
| 5,936,611 A | * | 8/1999 | Yoshida ...................... 345/158 |
| 6,069,663 A | | 5/2000 | Bessel et al. ................ 348/446 |
| 6,157,319 A | | 12/2000 | Johns et al. ........... 340/852.72 |
| 6,185,629 B1 | | 2/2001 | Simpson et al. .............. 710/10 |
| 6,223,348 B1 | | 4/2001 | Hayes et al. ................. 725/152 |
| 6,311,268 B1 | | 10/2001 | Chu ............................... 713/1 |
| 6,392,757 B2 | | 5/2002 | Manowitz ................... 358/1.15 |
| 6,401,198 B1 | | 6/2002 | Harmer et al. ................. 713/1 |
| 6,407,779 B1 | | 6/2002 | Herz ........................... 348/734 |
| 6,574,588 B1 | | 6/2003 | Shapiro et al. ................ 703/24 |
| 6,599,194 B1 | | 7/2003 | Smith et al. ................... 463/30 |
| 6,809,779 B2 | * | 10/2004 | Chang et al. ................ 348/734 |
| 6,819,364 B2 | * | 11/2004 | Creed et al. ................. 348/569 |
| 2001/0011953 A1 | * | 8/2001 | Shintani et al. ......... 340/825.22 |
| 2001/0033243 A1 | | 10/2001 | Harris et al. ................. 341/176 |
| 2002/0056090 A1 | | 5/2002 | Wagner et al. ................ 725/32 |
| 2002/0097165 A1 | | 7/2002 | Hulme .................... 340/825.72 |
| 2002/0174270 A1 | | 11/2002 | Stecyk et al. ................... 710/1 |
| 2003/0061604 A1 | | 3/2003 | Elcock et al. ................ 717/170 |
| 2003/0066080 A1 | | 4/2003 | Kamieniecki ................ 725/80 |

* cited by examiner

*Primary Examiner*—Michael Horabik
*Assistant Examiner*—William Bangachon
(74) *Attorney, Agent, or Firm*—John L. Rogitz

(57) ABSTRACT

A system and method for controlling a home entertainment system includes a television having one more peripheral electronic entertainment devices connected thereto. Also, the system includes a single remote control unit for controlling all of the system components. The television, the peripheral devices, and the remote control unit include respective memory slots with which a portable memory media can be engaged. Accordingly, the memory media can be engaged with the television or the peripheral devices so that control commands and user defined preferences are downloaded thereto. Thereafter, the memory can be engaged with the remote control unit so that the control commands and user defined preferences for each component are uploaded thereto. As intended by the present invention, the remote control unit includes a microprocessor for resolving any conflicting command codes or user defined preferences.

18 Claims, 1 Drawing Sheet

SYSTEM AND METHOD FOR CONTROLLING A HOME ENTERTAINMENT SYSTEM

FIELD OF THE INVENTION

The present invention relates generally to home entertainment systems.

DESCRIPTION OF THE RELATED ART

Televisions have become ubiquitous. In fact, many families own several televisions and may have a single "special" television dedicated to a multimedia home entertainment system. Typically, a home entertainment system includes multiple peripheral entertainment devices connected to a television. For example, a home entertainment system can include a digital versatile disk (DVD) player, a video cassette recorder (VCR), a personal video recorder (PVR), an audio/visual amplifier (A/V amp), a television broadcast receiver (i.e., a satellite receiver or a cable receiver), multiple speakers, and a game system attached to a television. Thus, the owner of such a system can watch and record television content, watch and record movies, play video games, etc. while experiencing "surround sound."

As is oftentimes the case, the independent components that comprise the entertainment center do not communicate with each other and as a result, these stand alone devices are unaware of each other. Moreover, multiple remote control units are typically necessary to control the individual entertainment system components, e.g., one remote control unit per device. Unfortunately, the remote control units may provide conflicting commands. For instance, a remote control unit for the television may provide a signal that is recognized as "POWER ON/POWER OFF" by the television while the same signal may be recognized by the DVD player as "PLAY." Since the individual components do not communicate with each other, they are unable to rectify or resolve any conflicting command codes. As a consequence, a user has to intervene and prevent any conflicts by directly controlling one of the two conflicting devices via the buttons attached thereto.

Each device can also have user definable preference capabilities. For example, when watching a movie via the DVD player a user may prefer that the closed captioning be turned on at the DVD player, the theater sound preference selected on the stereo, and the movie color preference selected on the TV. Again, since the individual components do not communicate with each other, a user must spend a substantial amount of time configuring the individual components prior to watching the movie.

Accordingly, it is an object of the present invention to provide a means for "networking" stand alone devices comprising a home entertainment system.

SUMMARY OF THE INVENTION

A system for enabling the use of a single remote control device to control plural entertainment devices includes first and second electronic entertainment devices and a remote control device. Moreover, the system includes a portable memory media that is engageable with the entertainment devices or an Internet connected device and receives information therefrom. The memory device is removable from the entertainment devices or Internet connected device and engageable with the remote control device for transmitting the information thereto. As such, the remote control device can be used to control the first and second electronic entertainment devices.

Preferably, the first entertainment device is a TV and the second entertainment device is a VCR. Alternatively, the first entertainment device is a TV and the second entertainment device is a DVD. Or, the first entertainment device is a TV and the second entertainment device is PVR.

In a preferred embodiment, the system includes a third entertainment device. The portable memory device is engageable with the third entertainment device for receiving information therefrom. Also, the memory device is removable from the third entertainment device and engageable with the remote control device for transmitting information thereto from the third entertainment device.

Preferably, the portable memory device is a flash memory device. Further, the information from the entertainment devices includes predetermined command codes and user defined preferences. If the desired entertainment device does not support such a portable memory device, it is feasible to connect the portable memory device to an Internet connected device, e.g., a computer, and access the relevant entertainment device's information from an online service.

In another aspect of the present invention, an entertainment system includes a television having a peripheral entertainment device attached thereto and a single remote control unit. A method for controlling the entertainment system includes engaging a portable memory media with the peripheral entertainment device. Information from the peripheral entertainment device is transmitted to the portable memory media. The portable memory media is engaged with the television and information from the television is transmitted to the portable memory media. Next, the portable memory media is engaged with the remote control unit and the information stored on the portable memory media is transmitted to the remote control unit.

In yet another aspect of the present invention, a peripheral entertainment device for use with a television includes a slot that is engageable with a portable memory media and a user input device that is engageable with the portable memory media.

BRIEF DESCRIPTION OF THE DRAWINGS

The details of the present invention, both as to its structure and operation, can best be understood in reference to the accompanying drawings, in which like reference numerals refer to like parts, and in which.

DETAILED DESCRIPTION OF THE PREFERRED EMBODIMENTS

Figure 1:
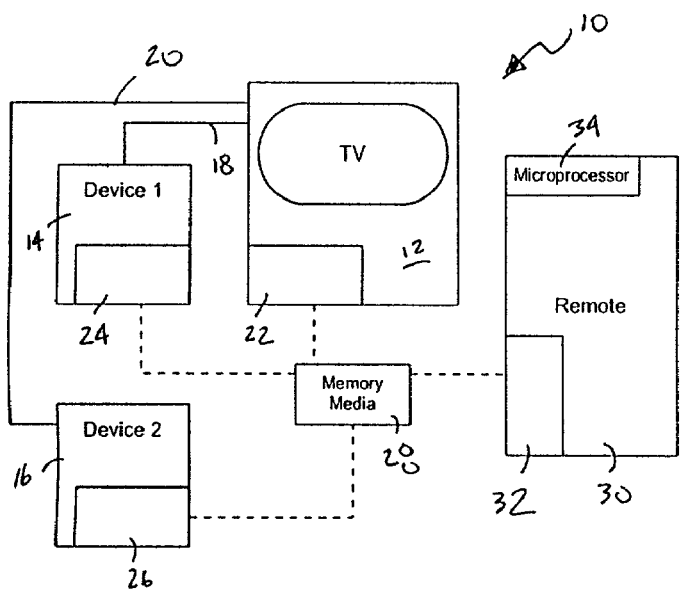
FIG. 1 is a block diagram of the system of the present invention.

Referring initially to FIG. 1, a system is shown, generally designated 10. As shown, the system 10 includes a television (TV) 12 having a first peripheral entertainment device 14 and a second peripheral entertainment device 16 connected thereto via a first cable 18 and a second cable 20, respectively. It is to be understood that more than two peripheral entertainment devices 14, 16 can be connected to the TV 12. Moreover, it can be appreciated that the devices 14, 16 can be one or more of the following: a DVD player, a VCR, a cable receiver, a satellite receiver, a personal recording device, a video game system, an A/V amplifier, and/or any other similar device.

Also, the cables 18, 20 can be coaxial cable, audio/video cable (A/V cable), composite video cable, super video cable (S video cable), luminance and chrominance video cable (Y & C video cable), component (Y, $P_B$, $P_R$) video cable, red blue green video cable (RGB video cable), optical cable, or any other connecting means well known in the art.

FIG. 1 also shows that the TV 12 and both peripheral devices 14, 16 include respective memory slots 22, 24, 26 that are sized and shaped to receive a complementary sized and shaped portable memory media 28. In a preferred embodiment, the portable memory media 28 is a flash memory device, e.g., a Memory Stick® manufactured and sold by Sony®. However, it is to be appreciated that the portable memory media 28 can be a portable random access memory (RAM) device, a portable electrically erasable programmable read-only memory (EEPROM) device, or any other similar portable media useful for transferring data or information from one device to another. As described in detail below, information from the TV 12 and the devices 14, 16, e.g., control commands and user preferences, can be downloaded to the portable memory media 28.

As further shown in FIG. 1, the system 10 includes preferably one remote control unit 30 that can be used to control each of the individual components of the entertainment system 10. FIG. 1 shows that the remote control unit 30 also includes a memory slot 32 that is sized and shaped to receive the portable memory media 28. Thus, as described below, information stored on the portable memory media 28 can be uploaded to the remote control unit 30. As shown, the remote control unit 30 includes a microprocessor 34 that is used to process any information uploaded to the remote control unit 30 via the portable memory media 28.

Figure 2:
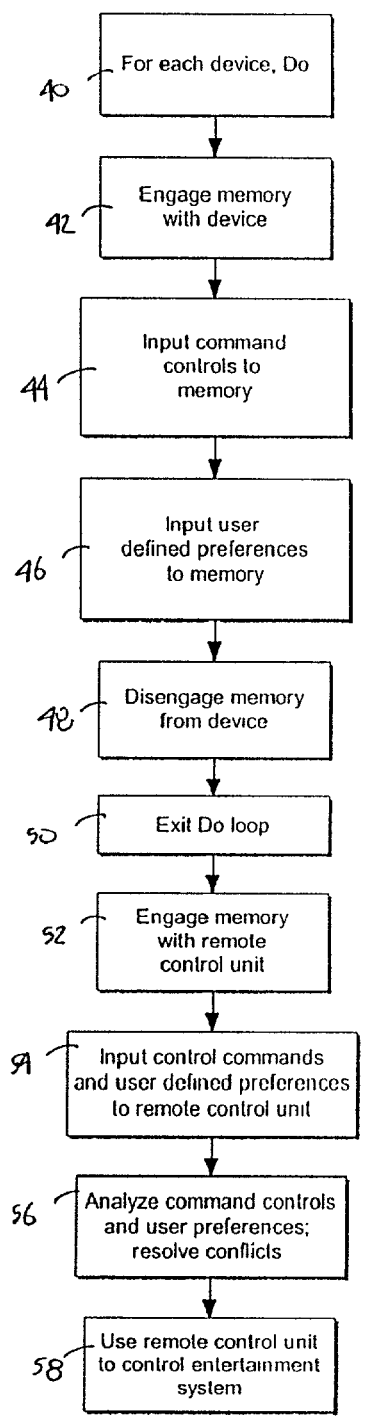
FIG. 2 is flow chart showing the method steps of the present invention.

Referring now to FIG. 2, the method steps of the present invention are shown and commence at block 40 with a do loop wherein the following steps are performed. At block 42, the portable memory media 28 is engaged with one of the following: the first device 14, the second device 16, or the TV 12. Proceeding to block 44, a predetermined set of command controls are input, e.g., downloaded, to the portable memory media 28. It is to be understood that the command controls can include play, pause, stop, forward, back, channel up, channel down, menu, display, volume up, volume down, reset, guide, swap, picture-in-picture (PIP), picture mode, enter, jump, off, on, etc. Next, at block 46, a predetermined set of user defined preferences are also input to the portable memory media 28. The user defined preferences can include video preferences, e.g., brightness, color, hue, sharpness, color temperature, etc. Also, the user defined preferences can include audio preferences, e.g., treble, bass, balance, steady sound on/off, stereo sound, mono sound, automatic second audio program (SAP), etc. The user defined preferences can also encompass parental settings, channel settings, etc. Such settings can be varied depending on device choice desired or per the desires of the individual user initiating such user defined preferences via an individual identifying scheme supported by the remote control.

Moving to block 48, the portable memory media 28 is disengaged from whichever device it was connected to at block 42, e.g., the TV 12, the first device 14, or the second device 16. At block 50, the do loop is exited after being completed for the TV 12 and each peripheral device 14, 16. Thereafter, at block 52, the portable memory media 28 is engaged with the remote control unit 30. Continuing to block 54, the control commands and user defined preferences for the TV 12 and each device 14, 16 are input, e.g., uploaded, to the remote control unit 30.

Next, at block 56, the remote control unit 30 analyzes the command controls and user preferences uploaded thereto. As described above, the remote control unit 30 includes a microprocessor 34, e.g., a computer chip, digital processor or the like, installed therein for performing the above mentioned analysis in order to resolve any conflicts and reconcile the user defined preferences. For example, if a particular command code frequency causes the first device 14 to turn on and off, but also causes the TV channel to change, the remote control unit 30 may resolve the conflict in favor of the TV 12. After the analysis is performed, the logic proceeds to block 58 where the single remote control unit 30 can be used to control the entire entertainment system without any conflicts.

It is to be understood that the remote control unit 30 acts as a "wireless hub" that can seamlessly operate the entire entertainment system 10. Moreover, by creating a common protocol for the TV 12 and each of the devices, a single network is effectively created.

While the particular SYSTEM AND METHOD FOR CONTROLLING A HOME ENTERTAINMENT SYSTEM as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

We claim:

1. A system for enabling the use of a single remote control device to control plural entertainment devices, comprising:
    at least first and second electronic entertainment devices;
    a remote control device; and
    a portable memory media engageable with the entertainment devices for receiving information therefrom, the memory media being removable from the entertainment devices and engageable with the remote control device for transmitting the information thereto, whereby the remote control device can be used to control the first and second electronic entertainment devices, the information including at least one user defined preference selected from the group consisting of: video preferences including brightness, color, hue, sharpness, and color temperature: audio preferences including treble, bass, balance, steady sound on/off, stereo sound, mono sound, automatic second audio program (SAP): preferred parental settings; preferred channel settings: and closed captioning preferences.

2. The system of claim 1 wherein the first entertainment device is a TV and the second entertainment device is a VCR.

3. The system of claim 1 wherein the first entertainment device is a TV and the second entertainment device is a DVD.

4. The system of claim 1 wherein the first entertainment device is a TV and the second entertainment device is a personal video recorder (PVR).

5. The system of claim 1 comprising at least a third entertainment device, the portable memory device being engageable with the third entertainment device for receiving information therefrom, the memory device being removable from the third entertainment devices and engageable with the remote control device for transmitting information thereto from the third entertainment device.

6. The system of claim 1, wherein the portable memory media is a flash memory device.

7. The system of claim 1, wherein the information from the entertainment devices includes predetermined command codes.

8. A method for controlling an entertainment system comprising at least one television, at least one peripheral entertainment device attached thereto, and a single remote control unit, the method comprising the acts of:
    engaging a portable memory media with the peripheral entertainment device;
    transmitting information from the peripheral entertainment device to the portable memory media, the information including at least one user defined preference selected from the group consisting of: video preferences including brightness, color, hue, sharpness, and color temperature: audio preferences including treble, bass, balance, steady sound on/off, stereo sound, mono sound, automatic second audio program (SAP): preferred parental settings: preferred channel settings: and closed captioning preferences;
    engaging the portable memory media with the television;
    transmitting information from the television to the portable memory media;
    engaging the portable memory media with the remote control unit; and
    transmitting the information from the portable memory media to the remote control unit.

9. The method of claim 8 wherein the remote control unit resolves any conflicting information contained on the portable memory media.

10. The method of claim 8, wherein the first peripheral device is one of the following: a DVD player, a VCR, a cable receiver, a satellite receiver, a personal recording device, and a video game system.

11. The method of claim 8, wherein the portable memory media is a flash memory device.

12. The method of claim 8, wherein the remote control unit includes a microprocessor for processing the information transmitted thereto from the portable memory media.

13. The method of claim 8, wherein the information from the peripheral entertainment device and the television at least partially includes predetermined command codes.

14. A peripheral entertainment device for use with a television, the device comprising:
    a slot engageable with a portable memory media for transferring information thereto, the information including at least one user defined preference selected from the group consisting of: video preferences including brightness, color, hue, sharpness, and color temperature: audio preferences including treble, bass, balance, steady sound on/off, stereo sound, mono sound, automatic second audio program (SAP): preferred parental settings; preferred channel settings; and closed captioning preferences; and
    a user input device engageable with the portable memory media.

15. The device of claim 14, wherein the portable memory media is a flash memory device.

16. The device of claim 14, wherein at least one device data is downloaded from the device to the portable memory media.

17. The device, of claim 16, wherein the device data is uploaded from the portable memory media to the user input device.

18. The device of claim 14, wherein the user input device is a remote control unit.

* * * * *